(12) United States Patent  
Ishikawa

(10) Patent No.: US 8,315,507 B2  
(45) Date of Patent: Nov. 20, 2012

(54) VIDEO GENERATION DEVICE, VIDEO GENERATION METHOD, AND VIDEO GENERATION PROGRAM

(75) Inventor: Masumi Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1132 days.

(21) Appl. No.: 12/087,412

(22) PCT Filed: Dec. 7, 2006

(86) PCT No.: PCT/JP2006/324465  
§ 371 (c)(1),  
(2), (4) Date: Jul. 3, 2008

(87) PCT Pub. No.: WO2007/077713  
PCT Pub. Date: Jul. 12, 2007

(65) Prior Publication Data  
US 2009/0169168 A1    Jul. 2, 2009

(30) Foreign Application Priority Data

Jan. 5, 2006 (JP) .................................. 2006-000459

(51) Int. Cl.  
*H04N 5/93* (2006.01)  
*G06K 9/00* (2006.01)  
*G06K 9/46* (2006.01)

(52) U.S. Cl. ..................... 386/278; 386/230; 386/282

(58) Field of Classification Search ............... 386/52, 386/278, 230, 282  
See application file for complete search history.

(56) References Cited

U.S. PATENT DOCUMENTS

| | | | |
|---|---|---|---|
| 7,587,124 B2 * | 9/2009 | Horiuchi et al. | 386/248 |
| 7,904,813 B1 * | 3/2011 | Takahashi et al. | 715/720 |
| 8,081,863 B2 | 12/2011 | Nomura et al. | |
| 2002/0018640 A1 * | 2/2002 | Bolduc | 386/52 |
| 2005/0114399 A1 | 5/2005 | Hosoi | |
| 2007/0067724 A1 | 3/2007 | Takahashi et al. | |

FOREIGN PATENT DOCUMENTS

JP    2002-199333 A    7/2002

(Continued)

OTHER PUBLICATIONS

S. Akamatsu, Computer Recognition of Human Face—A Survey -, Transactions of the Institute of Electronics, Information and Communication Engineers, vol. J80-A:8, pp. 1215-1230.

S. Akamatsu, Computer Recognition of Human Face—A Survey-, Transactions of the Institute of Electronics, Information and Communication Engineers, vol. J80-A:8, pp. 1215-1230.

(Continued)

*Primary Examiner* — Jeffrey Pwu  
*Assistant Examiner* — Samuel Ambaye  
(74) *Attorney, Agent, or Firm* — Foley & Lardner LLP

(57) ABSTRACT

In a device for editing input video and generating a new video, it is possible to control how long each object appearing in an input video should be made to appear in a new video according to the appearance ratio of each object in the input video. Appearance ratio calculation means 101 calculates an appearance ratio of each object appearing in the input video. Appearance ratio presentation length conversion means 102 converts the appearance ratio of each object into a video presentation length of each object in the new video by using a conversion rule in which a presentation length corresponding to the appearance ratio is uniquely determined. New video generation means 103 edits the input video and generates a new video that substantially satisfies the video presentation length of each object.

42 Claims, 13 Drawing Sheets

FOREIGN PATENT DOCUMENTS

| | | |
|---|---|---|
| JP | 2003-032616 A | 1/2003 |
| JP | 2003-333500 A | 11/2003 |
| JP | 2004-62451 A | 2/2004 |
| JP | 2004-289513 A | 10/2004 |
| JP | 2005-109566 A | 4/2005 |
| JP | 2005-157463 A | 6/2005 |
| WO | WO 00/40011 | 7/2000 |
| WO | WO 2005/074275 A1 | 8/2005 |

OTHER PUBLICATIONS

Y. Iwai et al., "A Survey on Face Detection and Face Recognition," Search Report of Information Processing Society of Japan (CVIM-149), 2005, pp. 343-368.

M. Takagi et al., "Newly Edited Image Analysis Hand Book," Tokyo University Publication, Sep. 2004, pp. 1569-1582.

* cited by examiner

| OBJECT NAME | FRAME NUMBER |
|---|---|
| OBJECT A | 000037<br>000038<br>000039<br>⋮ |
| OBJECT B | 000504<br>000503<br>⋮<br>000724<br>001341<br>001342 |
| OBJECT C | 001342<br>001343<br>⋮ |

Fig. 10

| OBJECT GROUP NAME | FRAME NUMBER | DETECTED POSITION | FEATURE AMOUNT | CLUSTER NUMBER |
|---|---|---|---|---|
| OBJECT GROUP A | 000037 | (x1,y1) | F1 | A1 |
| | 000038 | (x2,y2) | F2 | A1 |
| | 000039 | (x3,y3) | F3 | A1 |
| | ⋮ | ⋮ | ⋮ | |
| OBJECT GROUP B | 000504 | (x4,y4) | F4 | B1 |
| | 000503 | (x5,y5) | F5 | B1 |
| | ⋮ | ⋮ | ⋮ | |
| | 000724 | (x6,y6) | F6 | B2 |
| | 001341 | (x7,y7) | F7 | B3 |
| | 001342 | (x8,y8) | F8 | B3 |
| | ⋮ | ⋮ | ⋮ | |
| OBJECT GROUP C | 001342 | (x9,y9) | F9 | C1 |
| | 001343 | (x10,y10) | F10 | C1 |
| | ⋮ | ⋮ | ⋮ | |

VIDEO GENERATION DEVICE, VIDEO GENERATION METHOD, AND VIDEO GENERATION PROGRAM

This application is the National Phase of PCT/JP2006/324465, filed Dec. 7, 2006, which claims priority to Japanese Patent Application No. 2006-000459, filed Jan. 5, 2006. The contents of the foregoing applications are incorporated by reference in their entirety.

TECHNICAL FIELD

The present invention relates to a video generation device and method for editing an input video to generate a new video, and more particularly, to a video generation device, a video generation method, and a video generation program for generating new video in consideration of an appearance ratio of objects which appear in the input video.

BACKGROUND ART

One example of this type of a conventional video generation device is described in JP-2005-157463-A. The configuration of the video generation device described in this official publication is shown in FIG. 1. This conventional video generation device edits contents data 904 received through ground digital broadcasting to generate summary data thereof. Contents data 904 is a collection of frames, where each frame includes additional information indicative of persons, places and the like which appear in the frame, in addition to video data and audio data. Contents data capture means 900, upon capturing contents data 904, outputs the additional information of each frame to appearance ratio calculation means 901, and also outputs the contents of each frame to summary data creation means 903. Appearance ratio calculation means 901 recognizes persons and places which appear in each frame based on the additional information to calculate an appearance ratio in which each appearing person and place appear in an arbitrary frame. Main character and main stage decision means 902 selects an appearing person and place which have the appearance ratio equal to or higher than a threshold as a potential hero and a potential center position. Summary data creation means 903 selects frames in which both the potential hero and potential center position, selected by main character and main stage decision means 902, appear in the same frame, with reference to the additional information of each frame sent thereto from contents data capture means 900, and rearranges the selected frames in time series, thereby creating summary data which is a story-like summary of contents data 904. However, there is no clear description as to how many frames, in which each potential hero and each potential center position appear, should be selected to create the summary data.

DISCLOSURE OF THE INVENTION

As described above, in the conventional video generation device which generates a new video, taking into consideration the appearance ratio of an object which appears in an input video subjected to editing, the appearance ratio of each object is utilized only for determining a potential hero and a potential center position, and there is no idea to use the appearance ratio as the basis for determining how long each object should be made to appear in a new video. Thus, it is necessary to separately set how long each object should be made to appear in a new video, so that it is not easy to generate a new video or the like in which the appearing time of each object in a new video is decided in accordance with an appearance ratio of each object in an input video.

It is a first exemplary object of the present invention to enable how long each object appearing in an input video should be made to appear in a new video to be controlled in accordance with an appearance ratio of each object in the input video.

It is a second exemplary object to enable how long each object appearing in an input video should be made to appear in a new video to be controlled in accordance with the appearance ratio of each object in the input image and the user's preference.

A first video generation device of the present invention is based on a video generation device for editing an input video to generate a new video, wherein an appearance ratio of each object which appears in the input video is converted to a presentation length of a video related to each object in a new video. More specifically, the video generation device comprises appearance ratio calculation means for calculating an appearance ratio of each object which appears in the input video, appearance ratio presentation length conversion means for converting the calculated appearance ratio of each object to a presentation length of the video related to each object in the new video, and new video generation means for editing the input video to generate a new video which substantially satisfies the presentation length of the video related to each object resulting from the conversion. By employing such a configuration to convert the appearance ratio of each object which appears in the input video to the presentation length of the video related to each object in the new video, the first object of the present invention can be achieved.

Also, in a second video generation device of the present invention, the appearance ratio presentation length conversion means converts the appearance ratio of each object to a presentation length using a conversion rule which is selected by a user from among a plurality of conversion rules different from one another, which uniformly determine a presentation length corresponding to an appearance ratio, in the first video generation device. By employing such a configuration to convert the appearance ratio of each object which appears in the input video to the presentation length of the video related to each object in the new video using a conversion rule selected by the user, the second object of the present invention can be achieved.

As described above, in the present invention, the appearance ratio calculation means calculates the appearance ratio of each object which appears in an input video, the appearance ratio presentation length conversion means converts the calculated appearance ratio of each object to a presentation length of a video related to each object in a new video using a previously determined conversion rule or a conversion rule selected by the user, and the new video generation means edits the input video to generate a new video which substantially satisfies the presentation length of the video related to each object, resulting from the conversion.

According to the present invention, it is possible to enable how long each object appearing in an input video should be made to appear in a new video to be controlled in accordance with the appearance ratio of each object in the input video. This is because the appearance ratio of each object which appears in the input video is converted to the presentation length of the video related to each object in the new video. In this way, it is possible to readily generate a new video or the like which enables the user to understand how long an object appearing in the input video appears in the input video.

Also, according to the configuration which converts the appearance ratio of each object which appears in the input video to the presentation length of the video related to each object in the new video using a conversion rule selected by the user, it is possible to enable how long each object appearing in an input video should be made to appear in a new video to be controlled in accordance with the appearance ratio of each object in the input image and the user's preference. In this way, it is possible to selectively generate a variety of videos such as a new video which enables the user to understand how long an object appearing in the input video appears in the input video, a new video in which each object appearing in the input video appear uniformly, and the like.

BRIEF DESCRIPTION OF THE DRAWINGS

FIG. 10 is a diagram showing an example of frame-associated information stored in a frame-associated information storage unit in the third exemplary embodiment of the present invention.

Figure 1:
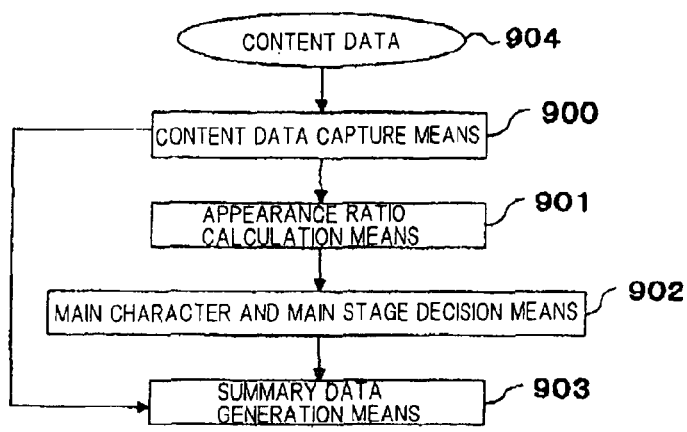
FIG. 1 is a block diagram of a conventional video generation device.

DESCRIPTION OF REFERENCE NUMERALS 100, 200, 300, 400, 500 Data Processing Devices
101, 201, 301 . . . Appearance Ratio Calculation Means
101a, 201a . . . Object Detection Means
301a . . . Object Group Detection Means
101b, 201b . . . Appearance Ratio Decision Means
301b . . . Feature Extraction Means
301c Clustering Means
301d Appearance Ratio Decision Means
102, 202, 302 . . . Appearance Ratio Presentation Length Conversion Means
202a . . . Conversion Rule Selection Means
103, 203, 303 . . . New Video Creation Means
110, 210, 310, 410, 510 . . . Video Input Means
120, 220, 320, 420, 520 . . . Storage Devices
121, 221, 321 . . . Object Detected Frame Storage Means
121a, 221a, 321a . . . Frame Storage units
121b, 221b, 321b . . . Frame-Associated Information Storage Units
122, 222, 322 . . . Conversion Rule Storage Units
130, 230, 330, 430, 530 . . . Video Output Means
240, 540 . . . Command Input Means
440, 550 . . . Video Generation Program

BEST MODE FOR CARRYING OUT THE INVENTION

First Exemplary Embodiment

Next, a first exemplary embodiment of the present invention will be described in detail with reference to the drawings.

Figure 2:
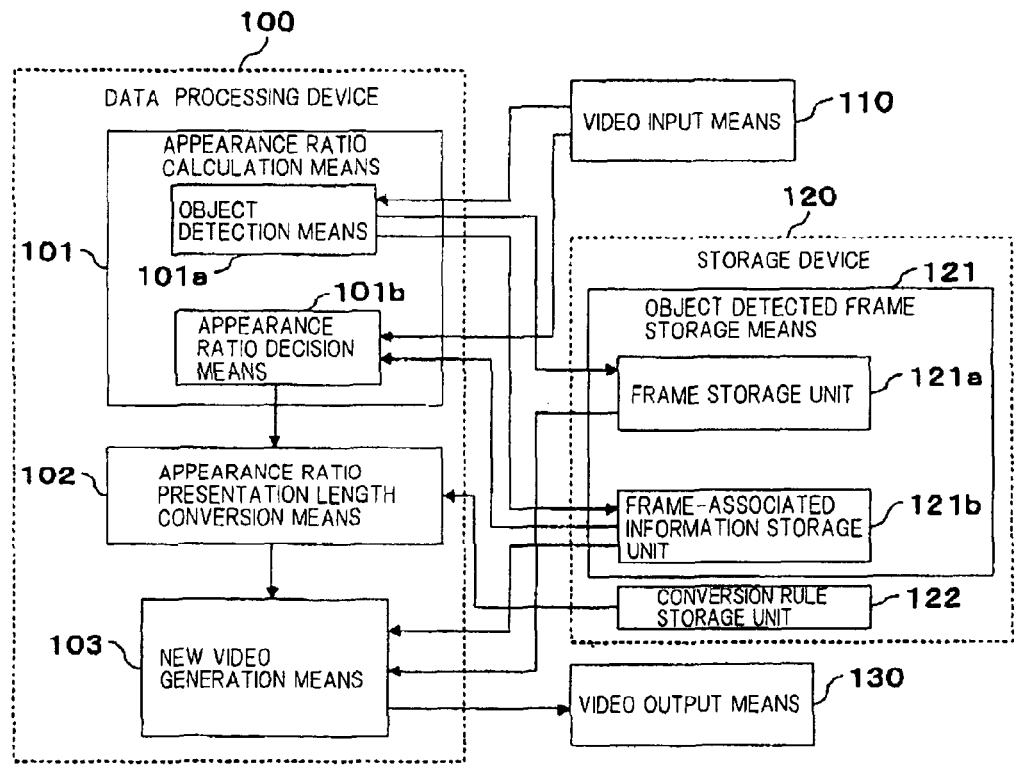
FIG. 2 is a block diagram showing the configuration of a first exemplary embodiment of the present invention.

Referring to FIG. 2, a video generation device according to the first exemplary embodiment of the present invention comprises data processing device 100 which operate under program control, video input means 110 through which a video is input, storage device 120, and video output means 130 for outputting a video.

Video input means 110 is means for inputting a video, and a video from which a new video is created is input by utilizing this video input means 110. Video output means 130 is provided to output a video, and a generated new video is output by utilizing this video output means 130.

Storage device 120 comprises object detected frame storage means 121 and conversion rule storage unit 122. Object detected frame storage means 121 includes frame storage unit 121a for storing a video frame in which an object appears, and frame-associated information storage unit 121b for storing a frame number of a video frame in which an object appears on an object-by-object basis. Conversion rule storage unit 122 stores one conversion rule represented in a format such as a conversion table, a conversion expression or the like. The conversion rule is a rule for converting an appearance ratio of each object which appear in an input video to a video presentation length related to each object in a new video. Here, a used conversion rule may be a conversion rule which, upon receipt of an appearance ratio, provides a presentation length which is not zero, as a presentation length corresponding thereto, or a conversion rule which provides a presentation length which may be zero depending on the value of the appearance ratio.

Data processing device 100 comprises appearance ratio calculation means 101, appearance ratio presentation length conversion means 102, and new video generation means 103.

Appearance ratio calculation means 101, which calculates an appearance ratio of each object included in an input video, includes object detection means 101a and appearance ratio decision means 101b.

Figures 3, 4:
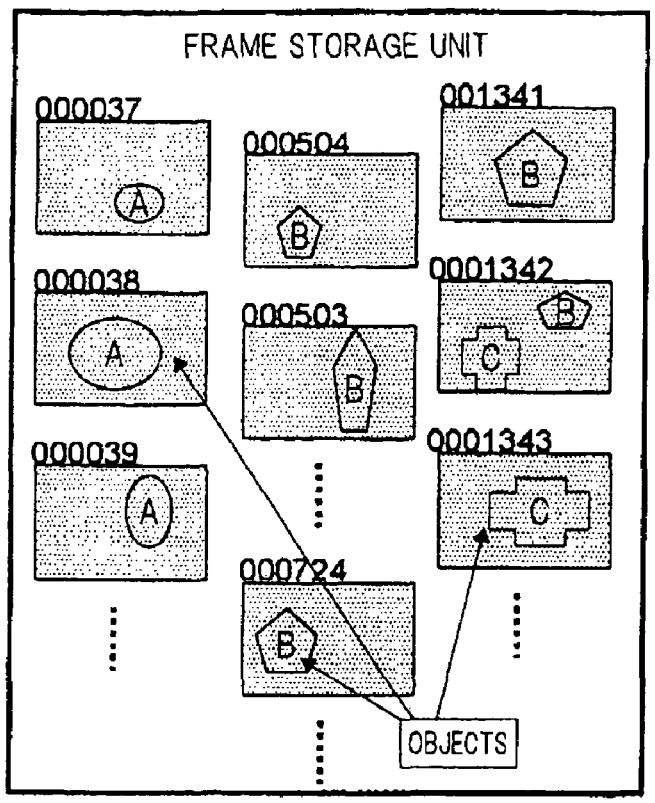
FIG. 3 is a diagram showing an example of video information stored in a frame storage unit in the first exemplary embodiment of the present invention.
FIG. 4 is a diagram showing an example of frame-associated information stored in a frame-associated information storage unit in the first exemplary embodiment of the present invention.

Object detection means 101a detects an object from each frame of a video received from video input means 110. Object detection means 101a stores image information of a frame in which an object is detected in frame storage unit 121a. Image information of a frame in which no object is detected may also be stored together in frame storage unit 121a. Also, object detection means 101a stores a frame number of a frame in which an object is detected in frame-associated information storage unit 121b on an object-by-object basis. FIG. 3 shows an example of image information stored in frame storage unit 121a, while FIG. 4 shows an example of a data structure stored in frame-associated information storage unit 121b.

Here, an object may be anything, among those captured in a video, which is noted by a user. For example, representative examples of objects may be a particular person such as Person A, Person B, an animal such as Dog A, Dog B, a plant such as Tree A Tree B, a building such as Tokyo Tower, Bay Bridge, a natural object such as Mt. Fuji, Lake Biwa, an artificial object such as a camera, a car, and the like.

Appearance ratio decision means 101b calculates an appearance ratio for each object based on the number of frames in which each object is detected from frame-associated information stored in frame-associated information storage unit 121b, and based on the total number of frames of an input video provided from video input means, and outputs the appearance ratios to appearance ratio presentation length conversion means 102. The calculation of the appearance ratio may be based on the number of video sections delimited by a certain reference such as a scene, a shot, a topic or the like, other than relying on the number of frames.

Appearance ratio presentation length conversion means 102 receives an appearance ratio of each object from appearance ratio decision means 101b, converts the appearance ratio of each object which appears in an input video to a presentation length of a video related to each object in a new video, using the conversion rule read from conversion rule storage unit 122, and outputs the appearance ratios to new video generation means 103. Here, the presentation length of a video refers to the length of time of a video presented in a new video, or the number of frames, or the number of video sections generated by delimiting a video under certain conditions.

New video generation means 103 receives the presentation length of each object from appearance ratio presentation length conversion means 102 and edits the input video to generate a new video which substantially satisfies the presentation length of the video related to each object. Among frames included in an input video, the number of a frame in which a certain object appears can be recognized by referencing frame-associated information storage unit 121b, and video information of a frame which has the frame number can be read from frame storage unit 121a. A variety of methods can be contemplated for generating a new video which substantially satisfies the presentation length of a video related to each object, and the present invention does not limit the method, but in this embodiment, new video generation means 103 selects a frame number utilized in a new video by the presentation length of each object from frame numbers stored in frame-associated information storage unit 121b on an object-by-object basis, next retrieves image information corresponding to the frame numbers selected by the presentation length from frame storage unit 121a on an object-by-object basis, and then combines these retrieved frames in a time series order, thereby generating a new video. Then, the generated new video is output to video output means 130.

Next, the general operation of this embodiment will be described in detail with reference to FIG. 2 and a flow chart of FIG. 5.

Figure 5:
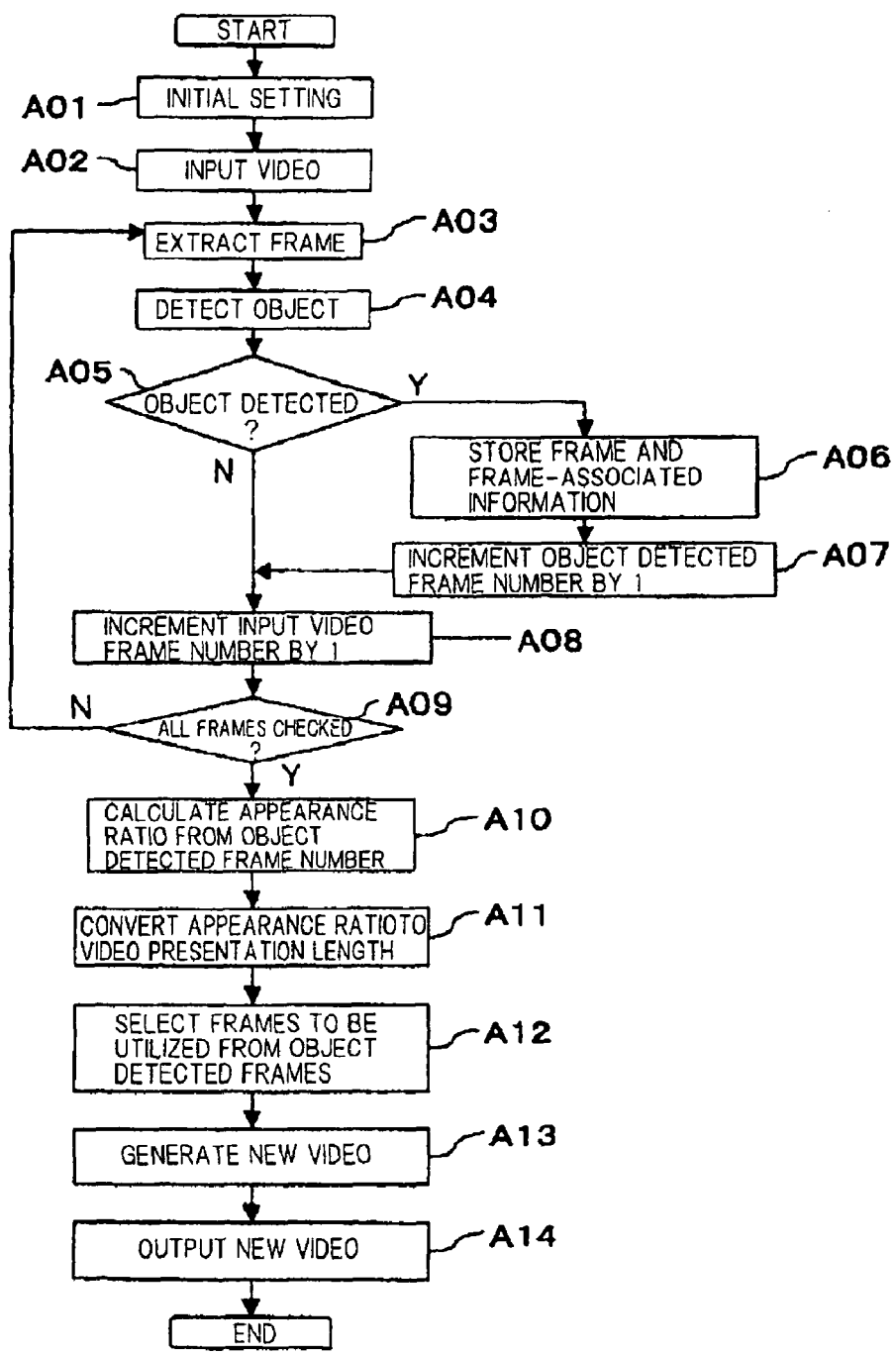
FIG. 5 is a flow chart showing the operation of the first exemplary embodiment of the present invention.

First, object detection means 101a initially sets an object detected frame number which is a variable for measuring, on an object-by-object basis, the number of frames in which an object included in an input video is detected, and sets an input video frame number which is a variable for measuring the total number of frames of the input video to zero, respectively (step A01 in FIG. 5).

Next, video input means 110 supplies a video to object detection means 101a (step A02). Object detection means 101a extracts frames one by one from the input video (step A03), and detects objects from the extracted frame (step A04).

A pattern recognition approach, for example, is used for the detection of objects. As an example, object detection means 101a calculates a difference based on pixel values between an image of an object previously stored as a template and an image in an input frame, and determines that the object of the template exists in the input image when the difference is equal to or smaller than a threshold. The image of an object stored as the template may be an image supplied by the user through video input means 110, or an image selected by object detection means 101a based on features of an object specified by the user. Another approach other than the illustrated template based approach may be applied to the detection of objects.

When an object is detected (step A05), object detection means 101a stores image information of a frame in which the object is detected in a frame storage unit 121a, and stores the frame number in frame-associated information storage unit 121b on an object-by-object basis (step A06). On the other hand, appearance ratio decision means 101b increments the object detected frame number for measuring the number of frames in which an object is detected on an object-by-object basis, and increments the input video frame number for measuring the total number of frames in the input video by one, respectively (steps A07, A08).

When no object is detected, appearance ratio decision means 101b increments only the input video frame number by one (step A08).

Processing from step A03 to step A08 is performed for all frames of the input video (step S09).

Next, appearance ratio decision means 101b calculates an appearance ratio of each object from the input video frame number and object detected frame number (step A10). The calculated appearance ratio of each object is supplied to appearance ratio presentation length conversion means 102.

Upon receipt of the appearance ratio of each object, appearance ratio presentation length conversion means 102 converts the appearance ratio of each object to a presentation length of each object in a new video in accordance with the conversion rule read from conversion rule storage unit 122 (step A11). The presentation length of each object resulting from the conversion is supplied to new video generation means 103.

Upon receipt of the presentation length of each object, new video generation means 103 selects frame numbers which are utilized in a new video by the presentation length of each object from frame numbers stored in frame-associated information storage unit 121b on an object-by-object basis (step A12). Then, new video generation means 103 retrieves image information of selected frame numbers for each object according to the presentation length from frame storage unit 121a, combines them, and outputs the generated new video to video output means 130 (step A13).

Video output means 130 outputs the video received from new video generation means 103 (step A14).

Next, effects of this embodiment will be described.

For creating a video related to an object which appears in an input video, this embodiment is configured to decide a presentation length of a video of each object in a new video by converting based on an appearance probability of each object which appears in the input video, so that the appearance time of each object can be controlled in the new video in accordance with the appearance ratio of each object in the input video. Thus, it is possible to readily generate a new video and the like in which the user can understand how long each object appears in the input video.

For reference, while the conversion rule is stored in storage device 120 in the first exemplary embodiment described above, an embodiment can also be contemplated, in which the conversion rule is incorporated in the logic of appearance ratio presentation length conversion means 102.

Second Exemplary Embodiment

Next, a second exemplary embodiment of the present invention will be described in detail with reference to the drawings.

Figure 6:
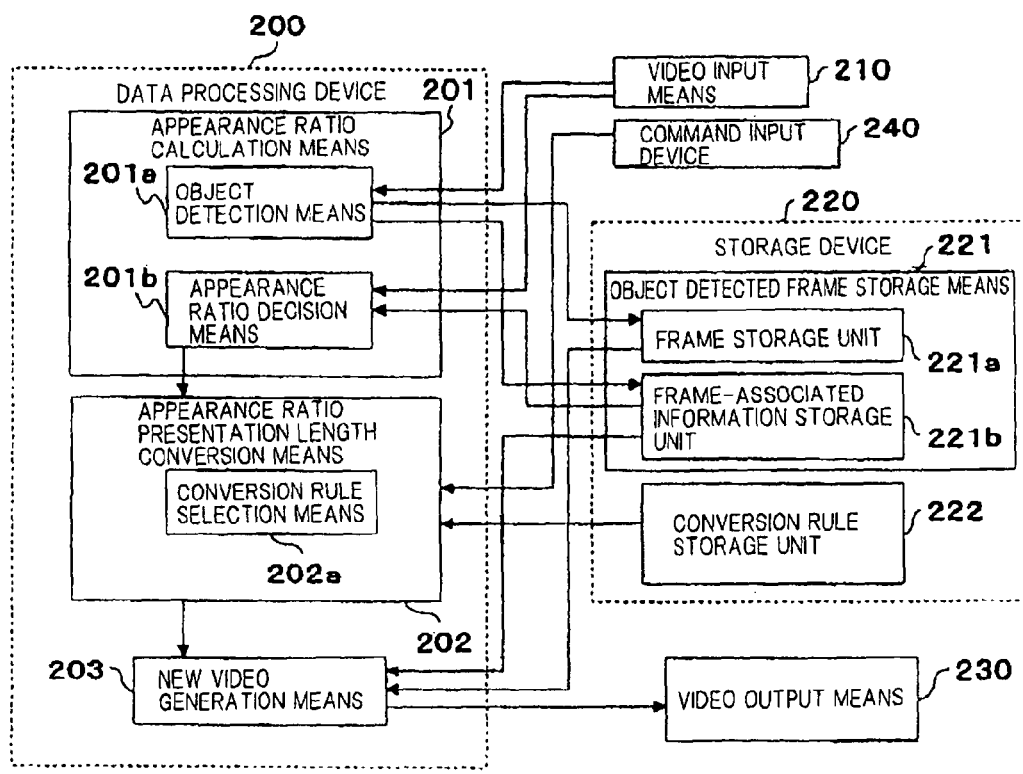
FIG. 6 is a block diagram showing the configuration of a second exemplary embodiment of the present invention.

Referring to FIG. 6, a video generation device according to the second exemplary embodiment of the present invention differs from the first exemplary embodiment shown in FIG. 2 in that it comprises command input device 240, it has conversion rule storage unit 222 for storing a plurality of conversion rules different from one another, rather than a single conversion rule, and appearance ratio presentation length conversion means 202 has conversion rule selection means 202a for selecting one conversion rule specified by a command entered by the user through command input device 240 from the plurality of conversion rules stored in conversion rule storage unit 222.

Next, the general operation of this embodiment will be described in detail with reference to FIG. 6 and the flow chart of FIG. 7.

Figure 7:
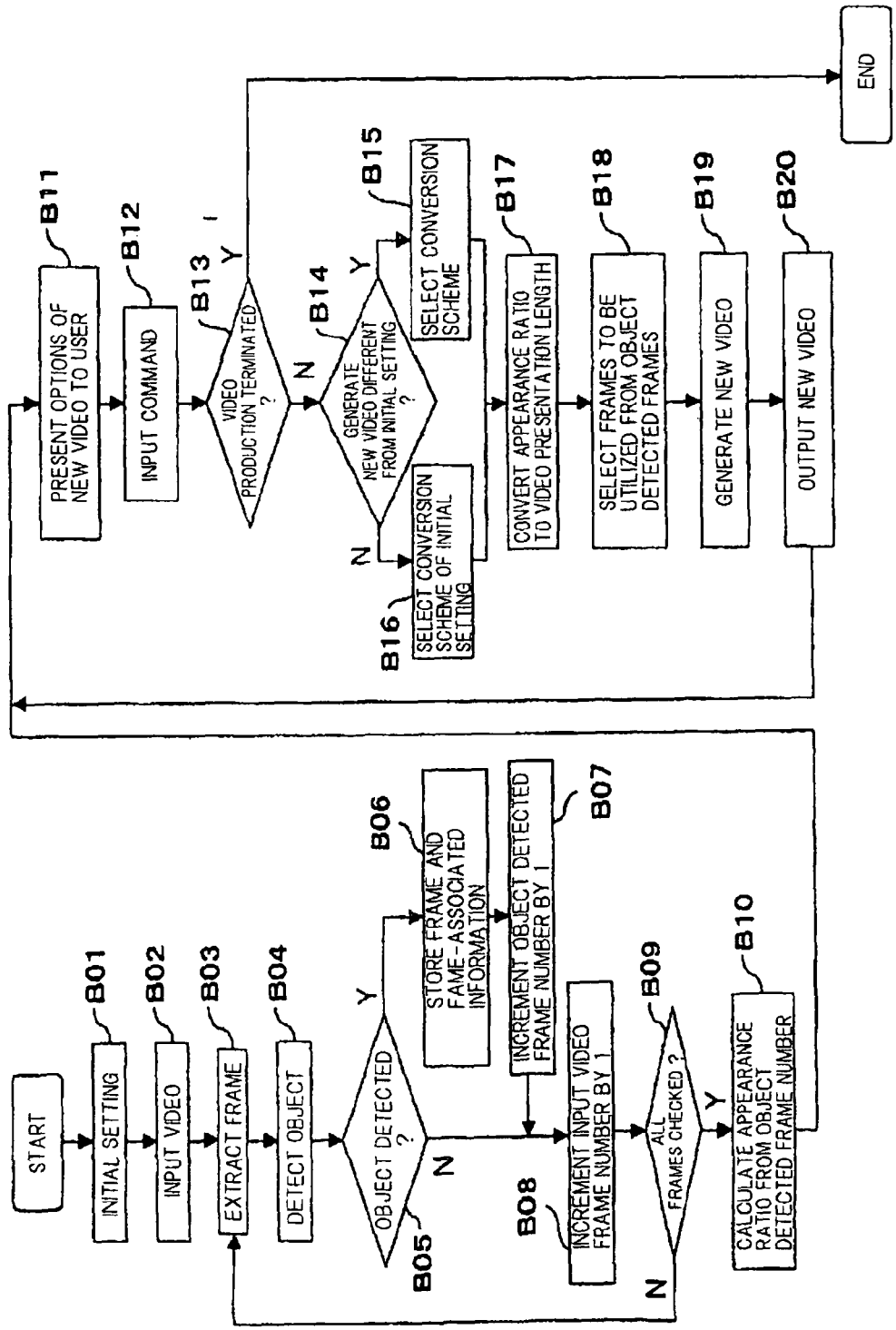
FIG. 7 is a flow chart showing the operation of the second exemplary embodiment of the present invention.

Operations from step B01 to step B10 in FIG. 7 are the same as those from step A01 to A10 in FIG. 5 which shows the operation of the first exemplary embodiment. However, in initial settings at step B01, processing is also performed for setting one conversion rule from among the plurality of conversion rules stored in conversion rule storage unit 222 as a default conversion rule, in addition to processing similar to that of the first exemplary embodiment. This default conversion rule is a conversion rule for generating an initially set type of new video from among a plurality of types of new videos.

When appearance ratio decision means 201b has completed the calculation of an appearance ratio of each object which appears in an input video, command input device 240 next presents queries to the user as to whether or not the generation of video is terminated, and as to which type of new image is generated when the generation of video is continued (step B11).

When the user selects to terminate the generation of video through a command entered from command input device 240, new video generation processing is terminated (steps B12, B13). For commands other than that, conversion rule selection means 202a determines whether or not a new video different from the initial setting is generated from a command entered by the user (step B14).

As a result of this determination, when the user generates a new video of a type different from the initial settings, conversion rule selection means 202a selects a conversion rule for generating a new video of an appropriate type from among the plurality of conversion rules stored in conversion rule storage unit 222 (step B15). On the other hand, when it is determined that the user generates a new video with the initial settings, conversion rule selection means 202a selects a conversion rule for generating a new video of the initially set type from among the plurality of conversion rules stored in conversion rule storage unit 222 (step B16).

Next, appearance ratio presentation length conversion means 202 converts the appearance ratio of each object supplied from appearance ratio decision means 201b to a video presentation length, using the conversion rule selected by conversion rule selection means 202a, in a manner similar to the first exemplary embodiment, and supplies the video presentation lengths to new video generation means 203 (step B17). New video generation means 203 selects frame numbers utilized in a new video according to the presentation length of each object, from frame numbers stored in frame-associated information storage unit 221b on an object-by-object basis in a manner similar to the first exemplary embodiment (step B18), retrieves image information of the selected frame numbers from frame storage unit 221a, combines the image information, and supplies the generated new video to video output means 230 (step B19). Video output means 230 outputs the video received from new video generation means 203 (step B20). Then, the flow returns to the processing at step B11.

Processing at steps B11 to B20 is repeated until the user selects the termination of the video generation process at step B13 through command input device 240.

Next, effects of this embodiment will be described.

Simultaneously with provided similar effects to the first exemplary embodiment, this embodiment comprises a plurality of conversion rules for converting the appearance ratio to the presentation length, and converts the appearance ratio of each object which appears in an input video to a presentation length of a video related to each object in a new video using a conversion rule selected by the user, so that it is possible to control how long each object appearing in the input video should be made to appear in the new video in accordance with the appearance ratio of each object in the input video and the user's preference. Thus, the user can selectively generate a variety of videos such as a new video in which the user can recognize all objects which appear in an input video, a new video in which the user can recognize objects which appear in an input video with higher appearance ratios, and the like.

Also, in this embodiment, since the processing of selecting a conversion rule, and generating and outputting a new video can be repeated, the user can generate a plurality of new videos in which objects have various presentation lengths.

Third Exemplary Embodiment

Next, a third exemplary embodiment of the present invention will be described in detail with reference to the drawings.

Figure 8:
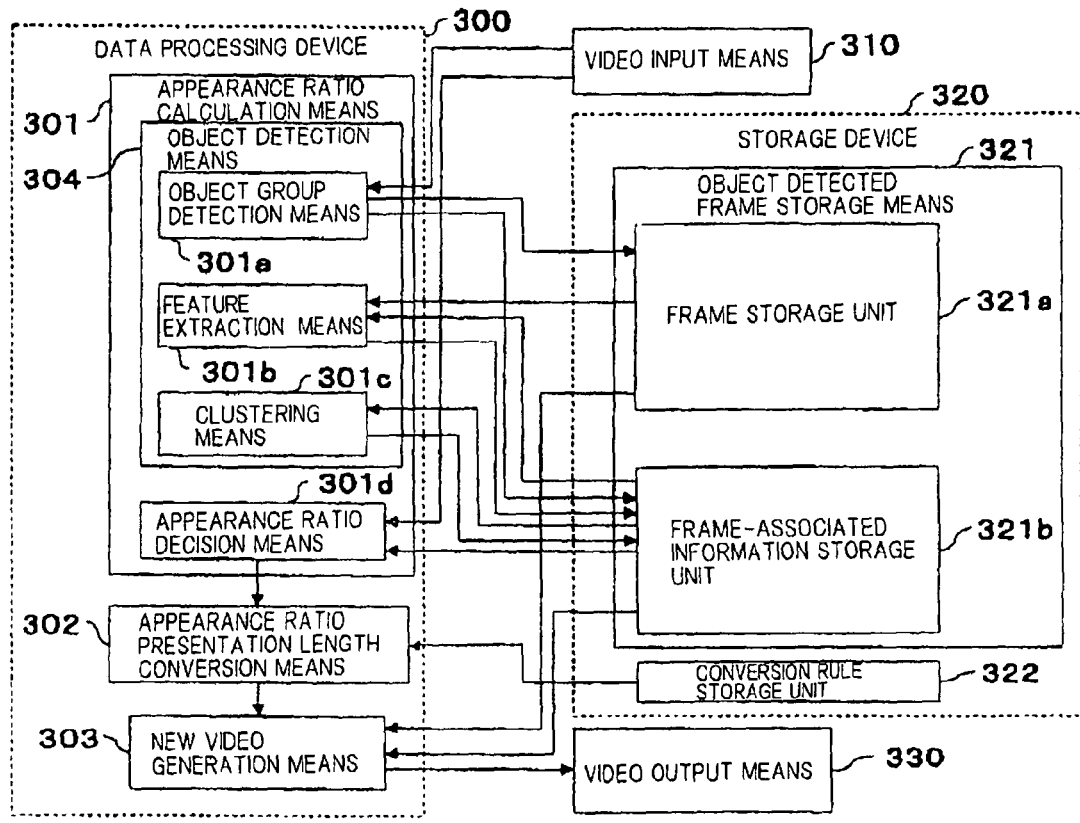
FIG. 8 is a block diagram showing the configuration of a third exemplary embodiment of the present invention.

Referring to FIG. 8, a video generation device according to the third exemplary embodiment of the present invention differs from the first exemplary embodiment shown in FIG. 2 in that it comprises object detection means 304 instead of object detection means 101a. Also, frame-associated information storage unit 321b is structured to hold, for each object group name, a frame number in which the object group was detected, the position of the object in a frame, and its feature and cluster number, as shown in FIG. 10.

Object detection means 304 includes object group detection means 301a, feature extraction means 301b, and clustering means 301c.

Object group detection means 301a detects an object group from each frame of a video received from video input means 310 through pattern recognition, in a manner similar to object detection means 101a. The "object group" is mentioned herein because an object group detected here can be classified into plural numbers, each of which can be one object, but it does not mean that a plurality of objects which appear physically separately in frames will be extracted.

Figure 9:
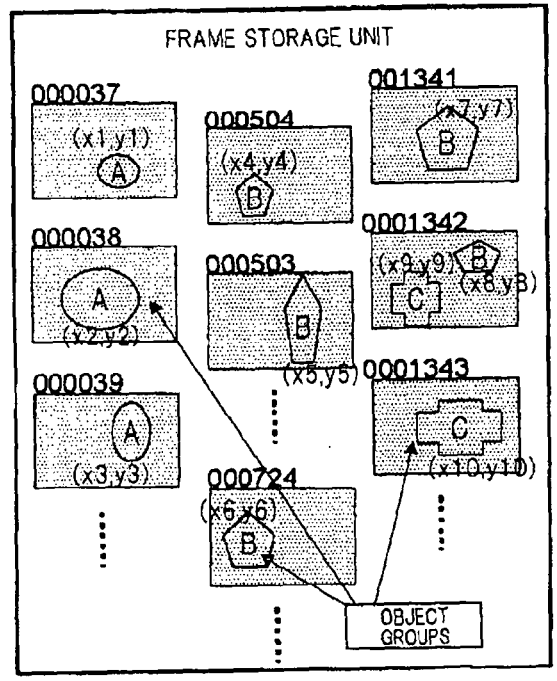
FIG. 9 is a diagram showing an example of image information stored in a frame storage unit in the third exemplary embodiment of the present invention.

Object group detection means 301a stores image information of a frame in which an object group is detected, as shown in FIG. 9, in frame storage unit 321a. Also, as shown in FIG. 10, the frame number of a frame in which an object group is detected, and the position at which the object group is detected in the frame are stored in frame-associated information storage unit 321b.

Feature extraction means 301b extracts an image of an object group portion, utilizing the detection position of the object group in each frame stored in frame-associated information storage unit 321b, from image information of each of frames stored in frame storage unit 321a, and extracts a feature of the object group from the image. Feature extraction means 301b stores the extracted feature in frame-associated information storage unit 321b for each object group, as shown in FIG. 10.

Based on features stored in frame-associated information storage unit 321b, clustering means 301c aggregates frames, from which features of similar values are extracted for each object group into the same cluster as frames in which the same object is detected. Then, clustering means 301c gives the same cluster number to frames which belong to the same cluster for storage in frame-associated information storage unit 321b, as shown in FIG. 10.

The frames given the same cluster number are treated as frames in which the same objects appear in a manner similar to frames detected by object detection means 101a in the first exemplary embodiment. Therefore, appearance ratio decision means 301d measures the number of frames included in the same cluster, treats the number of frames included in each cluster equivalently to the number of frames in which each object is detected, for each cluster stored in frame-associated information storage unit 321b, for utilization in the calculation of the appearance ratio. New video generation means 303 in turn selects frame numbers utilized in a new video by the presentation length of each object, from frames that have been given each cluster number (in which each object is detected) stored in frame-associated storage unit 321b, retrieves image information of the selected frame numbers according to the presentation length from frame storage unit 321a for each object, and combines the image information.

Next, the general operation of this embodiment will be described in detail with reference to FIG. 8 and a flow chart of FIG. 11.

Figure 11:
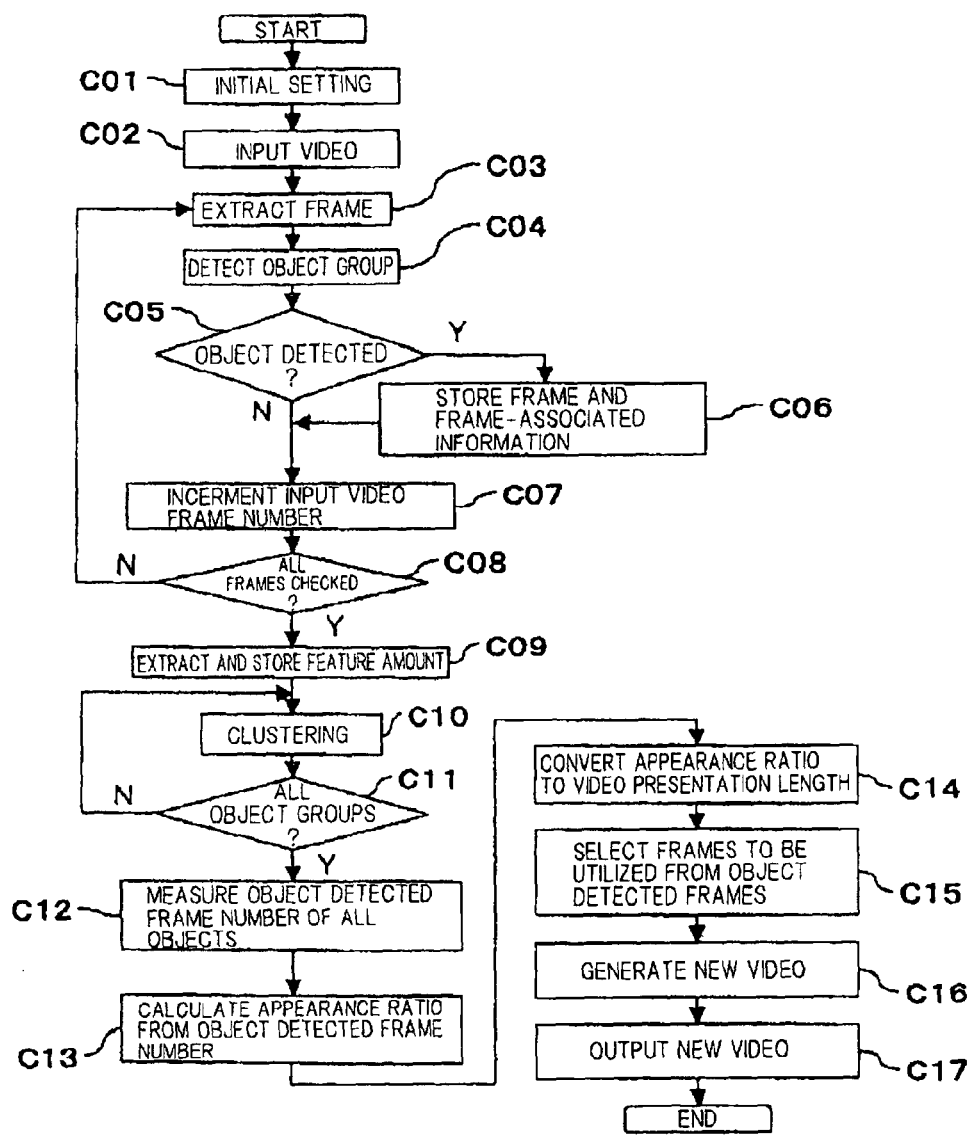
FIG. 11 is a flow chart showing the operation of the third exemplary embodiment of the present invention.

First, object group detection means 301a initially sets an object detected frame number which is a variable for measuring, on an object-by-object basis, the number of frames in which an object included in an input video is detected, and sets an input video frame number which is a variable for measuring the total number of frames of the input video to zero, respectively (step C01 in FIG. 11).

Next, video input means 310 supplies a video to object group detection means 301a (step C02). Object group detection means 301a extracts frames one by one from the input video (step C03), and detects an object group from the extracted frame (step A04). The detection of the object group is performed through pattern recognition in a manner similar to the first exemplary embodiment. When an object group is detected, object group detection means 301a stores image information of a frame in which the object group is detected in frame storage unit 321a, and stores a frame number and a position at which the object group is detected in frame-associated information storage unit 321b on an object group by object group basis (steps C05, C06). Appearance ratio decision means 301d in turn increments the input video frame number for measuring the total number of frames of the input video by one each time a frame is supplied to object group detection means 301a (step C07).

After the foregoing processing has been completed for all frames, feature extraction means 301b grabs an image of an object, utilizing a detection position of the object group in each frame stored in frame-associated information storage unit 321b, from image information of each of the frames stored in frame storage unit 321a, and extracts a feature of the object group from the image, and stores the extracted feature in frame-associated information storage unit 321b for each object group (step C09).

Next, based on features stored in frame-associated information storage unit 321b, clustering means 301c aggregates frames from which features of similar values are extracted for each object group into the same cluster as frames in which the same object is detected, and gives the same cluster number to frames which belong to the same cluster for storage in frame-associated information storage unit 321b (steps C10, C11).

Next, appearance ratio decision means 301d measures the number of frames belonging to each cluster stored in frame-associated information storage unit 321b as the object detected frame number which represents the number of frames in which each object is detected (step C12), because frames belonging to the same cluster indicate frames in which the same object is detected. Then, appearance ratio decision means 301d calculates an appearance ratio of each object from the total number of frames of the input video derived from video input means 310, and the object detected frame number, and supplies the appearance ratios to appearance ratio presentation length conversion means 302 (step C13).

Upon receipt of the appearance ratio of each object, appearance ratio presentation length conversion means 302 converts the appearance ratio of each object to a presentation length of each object in a new video in accordance with a conversion rule read from conversion rule storage unit 322 (step C14). The presentation length of each object resulting from the conversion is supplied to new video generation means 303. Upon receipt of the presentation length of each object, new video generation means 303 selects frame numbers utilized in the new video according to the presentation length of each object, from a frame number which has been given to each cluster number (in which each object is detected) stored in frame-associated information storage unit 321*b* (step C15), retrieves image information of the selected frame numbers according to the presentation length from frame storage unit 321*a* on an object-by-object basis, combines the image information, and outputs the generated new video to video output means 330 (step C16). Video output means 330 outputs the video received from new video generation means 303 (step C17).

Next, effects of this embodiment will be described.

In this embodiment, simultaneously provided with similar effects to the first exemplary embodiment, an object group detected by object group detection means 301*a* is classified into one or more objects based on a feature thereof, and an appearance ratio is calculated for each of the classified objects to create a new video, so that the new video can be generated based on the appearance ratio with respect to the object in units that provide more details, as compared with those recognized as the same object through pattern recognition. For example, when a unit which is detected by object group detection means 301*a*, as the same object group, is an animal object, objects such as a person, a dog, a car and the like, which are finer units than the animal object detected by object group detection means 301*a*, can be detected from the animal object to create a new video. On the other hand, when a unit detected by object group detection means 301*a*, as the same object group, is a person, particular persons such as Person A, Person B and the like, which are finer units than persons detected by object group detection means 301*a*, can be detected from them to create a new video. Further, when a unit detected by object group detection means 301*a*, as the same object group, is Person A, the state of a particular person with a particular site, such as Person A with a smiling face, Person A with an angry face, Person A with a crying face, and the like, which is a finer unit, can be detected from Person A who is detected by object group detection means 301*a* to create a new video. In this way, by utilizing this embodiment, even when an object can be detected only as a group, a new video can be generated on the basis of the appearance ratio of each object.

Fourth Exemplary Embodiment

Next, a fourth exemplary embodiment of the present invention will be described in detail with reference to the drawings.

Figure 12:
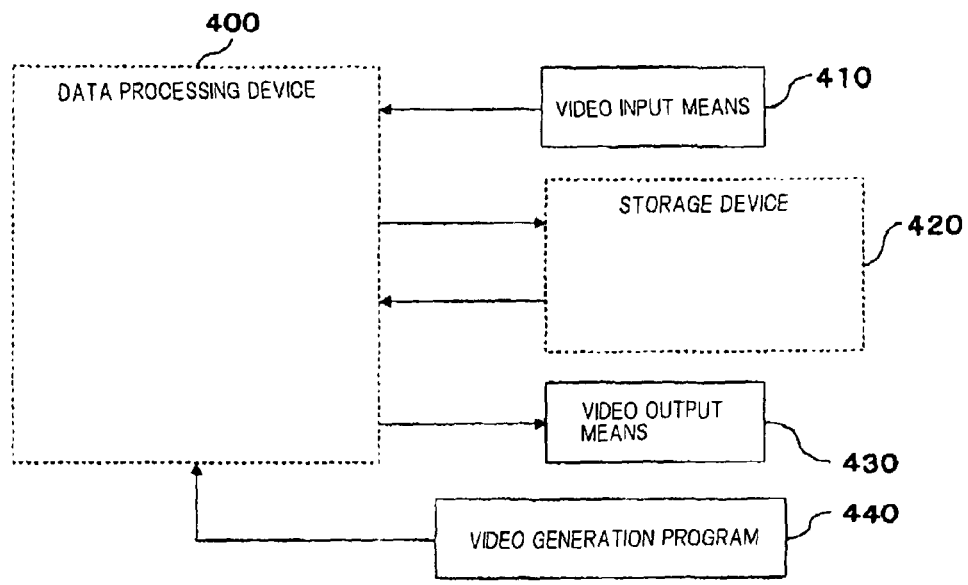
FIG. 12 is a block diagram showing the configuration of a fourth exemplary embodiment of the present invention.

Referring to FIG. 12, a video generation device according to the fourth exemplary embodiment of the present invention comprises data processing device 400 similar to the first and third exemplary embodiments, video input means 410, storage unit 420, and video output means 430, and further has video generation program 440.

Video generation program 440 is stored on a recording medium which can be read by a computer, such as a magnetic disk, a semiconductor memory or the like, and is read by data processing device 400 which forms part of the computer to control the operation of data processing device 400, thereby implementing object detection means 101*a*, appearance ratio decision means 101*b*, appearance ratio presentation length conversion means 102, and new video generation means 103 in the first exemplary embodiment shown in FIG. 2 on data processing device 400 to cause the computer to perform the process shown in FIG. 5, or thereby implementing object group detection means 301*a*, feature extraction means 301*b*, clustering means 301*c*, appearance ratio decision means 301*d*, appearance ratio presentation length conversion means 302, and new video generation means 303 in the third exemplary embodiment shown in FIG. 8 to cause the computer to perform the process shown in FIG. 11.

Fifth Exemplary Embodiment

Next, a fourth exemplary embodiment of the present invention will be described in detail with reference to the drawings.

Figure 13:
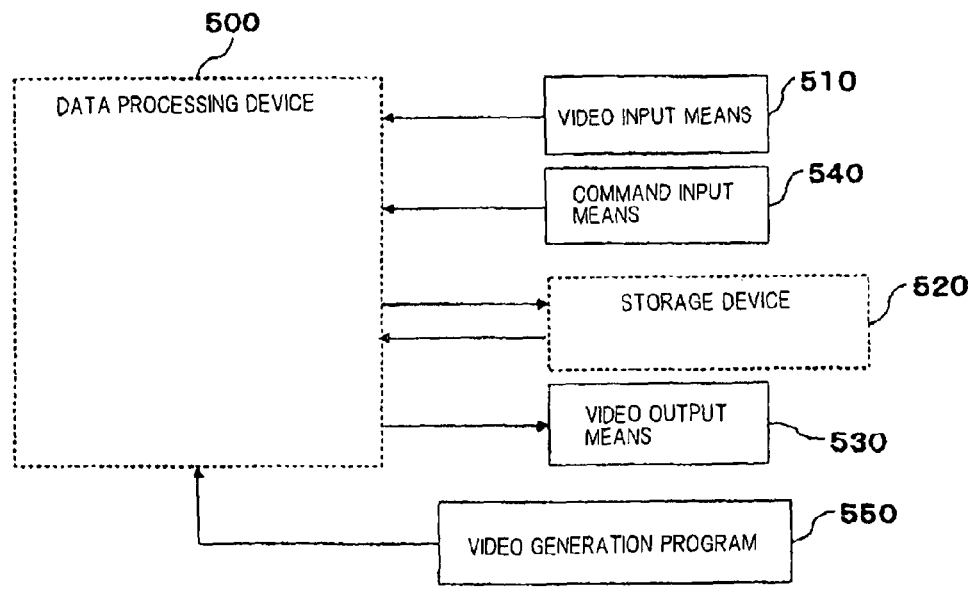
FIG. 13 is a block diagram showing the configuration of a fifth exemplary embodiment of the present invention.

Referring to FIG. 13, a video generation device according to a fifth exemplary embodiment of the present invention comprises data processing device 500, video input means 510, storage device 520, video output means 530, and command input device 540, similar to those in the second exemplary embodiment, and further has video generation program 550.

Video generation program 550 is stored on a recording medium which can be read by a computer, such as a magnetic disk, a semiconductor memory or the like, and is read by data processing device 500 which forms part of the computer to control the operation of data processing device 500, thereby implementing object detection means 201*a*, appearance ratio decision means 201*b*, appearance ratio presentation length conversion means 202, and new video generation means 203 in the second exemplary embodiment shown in FIG. 6 on data processing device 500 to cause the computer to perform the process shown in FIG. 7.

EXAMPLE 1

Next, the configuration and operation of embodiments of the present invention will be described in greater detail with reference to specific examples. Such Example 1 corresponds to the first exemplary embodiment of the present invention.

Figure 14:
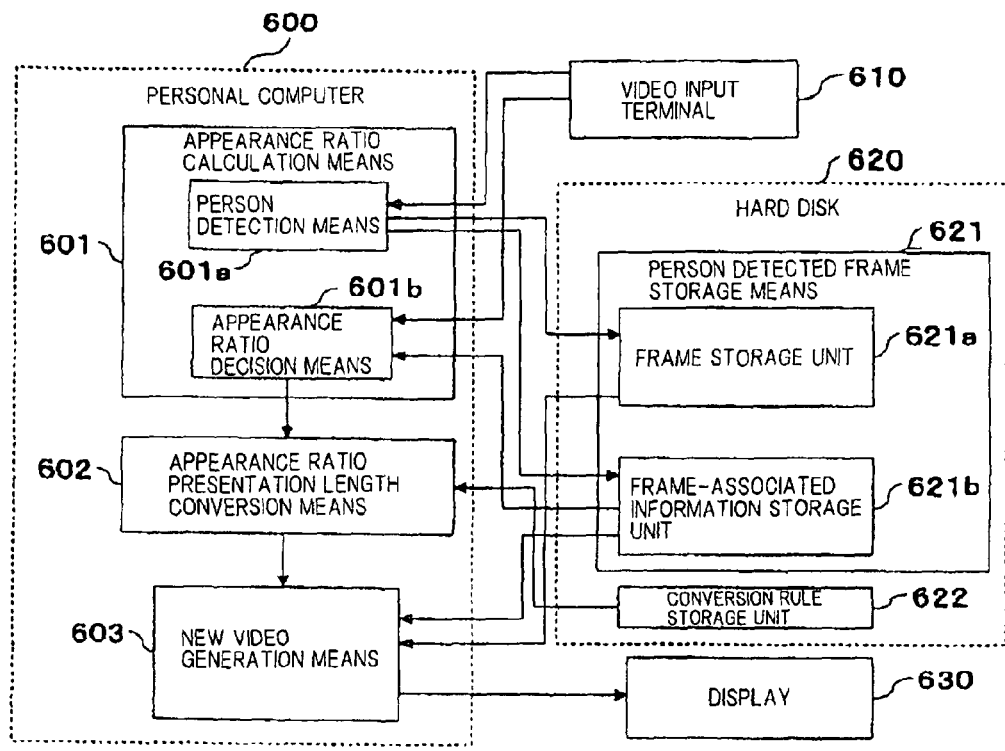
FIG. 14 is a block diagram showing the configuration of Example 1 of the present invention.

Example 1 shows an example in which the video generation device of the present invention is utilized in the generation of a video for a person which appears in an input video. As shown in FIG. 14, this Example comprises video input terminal 610 as video input means, personal computer 600 as a data processing device, hard disk 620 as a storage device, and display 630 as video output means, respectively.

Personal computer 600 comprises a central processing unit which functions as appearance ratio calculation means 601, appearance ratio presentation length conversion means 602, and new video generation means 603. Appearance ratio calculation means 601 includes person detection means 601*a* and appearance ratio decision means 601*b*.

Hard disk 620 comprises frame storage unit 621*a* for storing image information of a frame in which a person is detected by person detection means 601*a*, and frame-associated information storage unit 621*b* for storing the frame number of a frame in which a person is detected.

Assume now that a video is supplied from video input terminal 610. Person detection means 601*a* of the central processing unit detects particular persons such as Person A and Person B from each frame of the input video, and stores image information of frames in which the particular persons are detected in frame storage unit 621*a* within hard disk 620. Also, frame numbers are stored in frame-associated information storage unit 621*b*. As a method of detecting an individual person, for example, Person A, an approach is such that an image in which Person A is captured, for example, is stored as a temperate, and a determination is made that Person A exists in an input image when a difference between the input image and the template is equal to or less than a threshold. In addition, it is possible to utilize an approach which involves storing features such as eyes, nose, month and the like taken from an image of the face of Person A, and which involves determining that Person A exists in an input image when a feature similar to the feature of Person A is detected in the input image. Of course, an approach other than the examples mentioned above may be used as a method of detecting an individual person.

Person detection means 601a measures the number of frames in which each person such as Person A, Person B and the like is detected, and the total number of frames of the input video. Here, what is measured by person detection means 601a may be the number of frames, or the number of video sections which is delimited in accordance with a certain reference such as scene, shot, chapter or the like.

The detection of a person is implemented by using template matching, skin color detection, a model based on the direction and density of an edge, and the like, based on the shape and color of the body or face of a previously created person.

Appearance ratio decision means 601b calculates an appearance ratio of each person from the number of frames in which each person is detected, which is stored in frame-associated information storage unit 621b, and the total number of frames of the input video, which is obtained from the input video.

In addition to the appearance ratio based on a simple ratio of the number of frames, calculation can be made taking into consideration a variety of elements such as position, size and the like, as the appearance ratio. Alternatively, the appearance ratio may be re-assigned in accordance with the ranking of the appearance ratio, such as 50% is assigned to the first ranked appearance ratio, 40% to the second ranked appearance ratio, and so forth.

A method of calculating the appearance ratio will be illustrated below.

(1) Appearance Ratio Based on the Number of Frames

The appearance ratio is calculated from the number of frames in which each person appears with respect to the total number of frames of an input video.

[Appearance Ratio of Person A]=[Number of Frames in which Person A Appears]/[Total Number of Frames of Input Video]   (Equation 1)

(2) Appearance Ratio Based on the Number of Scenes

The appearance ratio is calculated from the number of scenes in which each person appears with respect to the total number of scenes of an input video. A scene can be defined by delimiting the scene at a point at which a feature such as the color, shape or the like extracted from each frame largely changes between adjacent frames, or at a point at which a video semantically changes.

[Appearance Ratio of Person A]=[Number of Scenes in which Person A Appears]/[Total Number of Scenes of Input Video]   (Equation 2)

(3) Appearance Ratio Based on the Number of Shots

The appearance ratio is calculated from the number of shots in which each person appears with respect to total number of shots of an input video. A shot refers to a video section delimited by breaks which occur in the video when the camera is turned on/off.

[Appearance Ratio of Person A]=[Number of Shots in which Person A Appears]/[Total Number of Shots of Input Video]   (Equation 3)

(4) Appearance Ratio Based on the Number of Chapters

The appearance ratio is calculated from the number of chapters in which each person appears with respect to the total number of chapters of an input video.

A chapter refers to a video section delimited by a break, set by a video producer or the like, based on unit time or contents of a video.

[Appearance Ratio of Person A]=[Number of Chapters in which Person A Appears]/[Total Number of Chapters of Input Video]   (Equation 4)

(5) Appearance Ratio Based on Weight Depending on Position

The appearance ratio is calculated from the number of frames in which each person appears, and which are weighted, based on a position at which each person is detected, with respect to the total number of frames of an input video.

[Expression 1]

$$\text{Appearance Ratio of Person } A = \frac{\sum_{i=0}^{N} W_{ai}}{\text{Total Number of Frames of Input Video}} \quad \text{(Equation 5)}$$

where N represents the number of frames in which Person A is detected, and wai represents a weight depending on a position at which Person A is detected within a frame. In a range of equal to or larger than zero and equal to or smaller than one, the closer the position at which Person A is detected to the center of the frame, the larger is the value of wai.

(6) Appearance Ratio Based on Weight Depending on Size

The appearance ratio is calculated from the number of frames in which each person appears, and which are weighted, based on the size of each person, with respect to the total number of frames of an input video.

[Expression 2]

$$\text{Appearance Ratio of Person } A = \frac{\sum_{i=0}^{N} W_{bi}}{\text{Total Number of Frames of Input Video}} \quad \text{(Equation 6)}$$

where N represents the number of frames in which Person A is detected, and wbi represents a weight depending on the size of Person A within the frames. In a range of equal to or larger than zero and equal to or smaller than one, the larger the proportion of the frame that is formed by the area of Person A, the larger is the value of wbi.

(7) Appearance Ratio Based on Weight Depending on Continuity of Frames

The appearance ratio is calculated from the number of frames in which each person appears, and which are weighted, based on the continuity of detected frames, with respect to the total number of frames of an input video.

[Expression 3]

$$\text{Appearance Ratio of Person } A = \frac{\sum_{i=0}^{N} W_{ci}}{\text{Total Number of Frames of Input Video}} \quad \text{(Equation 7)}$$

where N represents the number of frames in which Person A is detected, and wci represents a weight depending on the continuity of detected frames. In a range of equal to or larger than zero and equal to or smaller than one, the larger the number of frames in which Person A is continuously detected, the larger is the value of wci.

The appearance ratio calculated as described above is supplied to appearance ratio presentation length conversion means 602.

Appearance ratio presentation length conversion means 602 converts the appearance ratio of each person supplied from presentation ratio decision means 601b to a presentation length of each person in a new video, using a conversion rule stored in conversion rule storage unit 622. The presentation length refers to the number of frames, or the number of video sections delimited in accordance with a certain rule such as a scene, a shot, a chapter or the like.

A various types of videos can be generated by converting the appearance ratio to a presentation length using a variety of conversion rules in appearance ratio presentation length conversion means 602, as shown below.

(1) New Video in which all Performers Uniformly Appear

This new video is a new video in which all persons appearing in an input video appear for a uniform presentation length. To produce this new video, a conversion rule represented by an equation having characteristics as shown in FIG. 15, by way of example, a conversion table, or the like is used.

Figure 15:
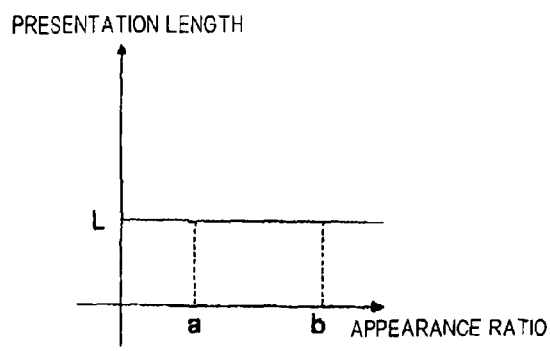
FIG. 15 is a diagram showing an example of a conversion rule for creating a new video in which all performers uniformly appear in Example 1 of the present invention.

According to the conversion rule shown in FIG. 15, although the appearance ratio of Person A having appearance ratio a differs from the appearance ratio of Person B having appearance ratio b, a video of Person A and a video of Person B are used in a new video by equal presentation length L. The user can recognize performers who appear in the input video by viewing this new video.

(2) New Video in which all Performers Appear in Proportion to Appearance Ratio

This new video is a new video in which all persons appearing in an input video appear for presentation lengths proportional to appearance ratios. To produce this new video, a conversion rule represented by an equation having characteristics as shown in FIG. 16, by way of example, a conversion table, or the like is used.

Figure 16:
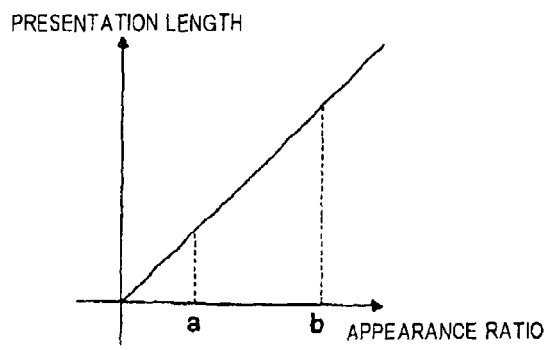
FIG. 16 is a diagram showing an example of a conversion rule for creating a new video in which all performers appear in proportion of appearance ratios in Example 1 of the present invention.

According to the conversion rule shown in FIG. 16, since appearance ratio b of Person B is larger than appearance ratio a of Person A, a video of Person B is used in a new video for a presentation length in proportion to the higher appearance ratio. The user can recognize performers appearing in the input video together with their appearance ratio by viewing this new video.

(3) New Video in which Performers with a Particular Appearance Ratio or Higher Appear in Proportion to Appearance Ratios This new video is a new video in which only persons having appearance ratios higher than certain threshold T, among persons who appear in an input video, are utilized for presentation lengths proportional to their appearance ratios. To generate this new video, a conversion rule represented by an equation having characteristics as shown in FIG. 17, by way of example, a conversion table, or the like is used.

Figure 17:
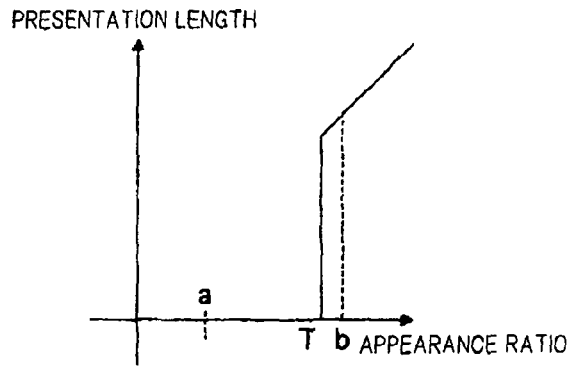
FIG. 17 is a diagram showing an example of a conversion rule for creating a new video in which all performers with a particular appearance ratio or higher appear in proportion to the appearance ratios in Example 1 of the present invention.

According to the conversion rule shown in FIG. 17, since appearance ratio a of Person A is smaller than threshold T, a video of Person A is not utilized in a new video. On the other hand, since appearance ratio b of Person B is larger than threshold T, a video of Person B is used in the new video for a presentation length proportional to appearance ratio b. The user can recognize a person (hero) who appears in the input video for a long time by viewing this new video.

(4) New Video in which Performers with Moderate Appearance Ratios Appear in Proportion to Appearance Ratios This new video is a new video in which only persons who have appearance ratio equal to or larger than certain threshold T1 and equal to or smaller than threshold T2, among persons who appear in an input video, are utilized for presentation lengths proportional to their appearance ratios. To generate this new video, a conversion rule represented by an equation having characteristics as shown in FIG. 18, by way of example, a conversion table, or the like is used.

Figure 18:
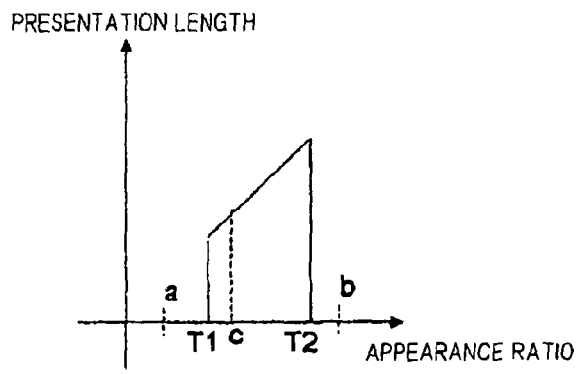
FIG. 18 is a diagram showing an example of a conversion rule for creating a new video in which performers with moderate appearance ratios appear in proportion to the appearance ratios in Example 1 of the present invention.

According to the conversion rule shown in FIG. 18, since appearance ratio a of Person A and appearance ratio b of Person B are smaller than threshold T1 or larger than threshold T2, videos of Person A and Person B are not used in a new video. A video of Person C having appearance ratio c which falls within the range between the thresholds is utilized for a presentation length proportional to appearance ratio c. The user can recognize a sub-hero who appears in the input video by viewing this new video.

(5) New Video in which Performers with Particular Appearance Ratios Appear for Longer Times, while Other Performers Uniformly Appear This new video is a new video in which only persons who have appearance ratios equal to or larger than certain threshold T1 and equal to or smaller than threshold T2, among persons who appear in an input video, are utilized for long presentation lengths, while other persons appear for short presentation lengths. To generate this new video, a conversion rule represented by an equation having characteristics as shown in FIG. 19, by way of example, a conversion table, or the like is used.

Figure 19:
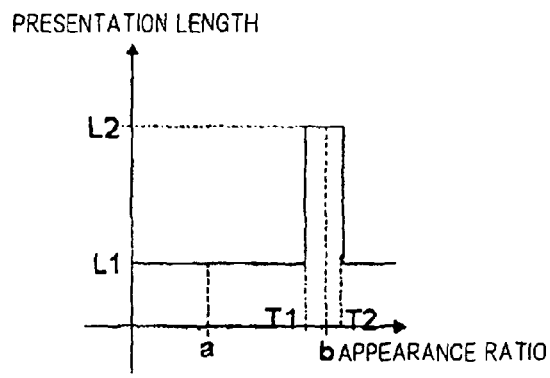
FIG. 19 is a diagram showing an example of a conversion rule for creating a new video in which performers with a particular appearance ratio appear for a longer time and other performers uniformly appear in Example 1 of the present invention.

According to the conversion rule shown in FIG. 19, since Person A with appearance ratio a falls out of the range between the thresholds, a video of Person A is used only for shorter presentation length L1. On the other hand, since Person B with appearance ratio b falls within the range between the thresholds, a video of Person B is used for longer presentation length L2. The user can recognize a video in which persons with particular presentation ratios appear by viewing this new video.

(6) New Video in which Only Performers with Low Appearance Ratio Uniformly Appear This new video is a new video in which persons having appearance ratios equal to or smaller than certain threshold T, among persons who appear in an input video, are utilized for a uniform presentation length. To generate this new video, a conversion rule represented by an equation having characteristics as shown in FIG. 20, by way of example, a conversion table, or the like is used.

Figure 20:
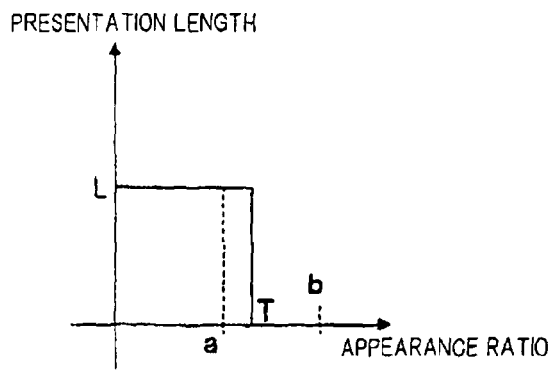
FIG. 20 is a diagram showing an example of a conversion rule for creating a new video in which only performers with low appearance ratios uniformly appear in Example 1 of the present invention.

According to the conversion rule shown in FIG. 20, since appearance ratio a of Person A is equal to or smaller than threshold T, a video of Person A is used for presentation length L in the new video. On the other hand, since appearance ratio b of Person B is larger than threshold T, a video of Person B is not used in the new video. The user can recognize a supporting actor who appears in the input video by viewing this new video.

(7) New Video in which Performers with Higher Appearance Ratios Appear for Longer Times This new video is a new video in which persons who appear in an input video with a variety of appearance ratios are utilized for nonlinear presentation lengths with respect to the appearance ratios. To generate this new video, a conversion rule represented by an equation having characteristics as shown in FIG. 21, by way of example, a conversion table, or the like is used.

Figure 21:
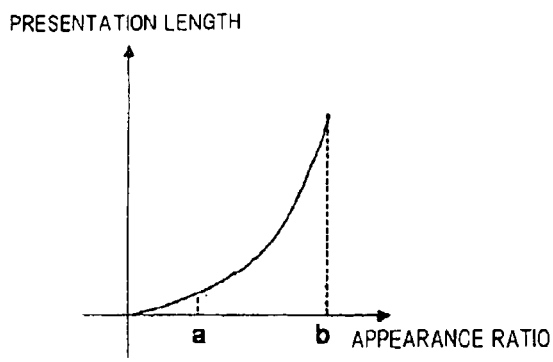
FIG. 21 is a diagram showing an example of a conversion rule for creating a new video in which a performer with a higher appearance ratio appears for a longer time in Example 1 of the present invention.

According to the conversion rule shown in FIG. 21, since appearance ratio b of Person B is larger than appearance ratio a of Person A, a video of Person B is used for a longer presentation length than a video of Person A in a new video. The user can clearly recognize the appearance ratio of each performer who appears in the input video.

Referring again to FIG. 14, new video generation means 603 selects a frame, in which each person is detected, from frame storage unit 621a of person detected frame storage means 621 for a presentation length of each person supplied from appearance ratio presentation length conversion means 602, and combines the selected frames to generate a new video.

As a frame selection method, there is an approach of randomly selecting flames for a presentation length of each object from frames in which each object is detected, and which are stored in frame-associated information storage unit 621b. Otherwise, an approach of preferentially selecting frames, the frame numbers of which are sequential, an approach of preferentially selecting frames in a time zone in which a large voice is detected within an input video as important frames, an approach of preferentially selecting frames near the end of a video at which a climax is often reached, and the like may be given as examples.

A combined new video is output to display 630. The user views the new video output to display 630.

EXAMPLE 2

Example 2 shows an example in which the video generation device of the present invention is utilized to generate a video for persons who appear in an input video. Such Example 2 corresponds to the second exemplary embodiment of the present invention.

Figure 22:
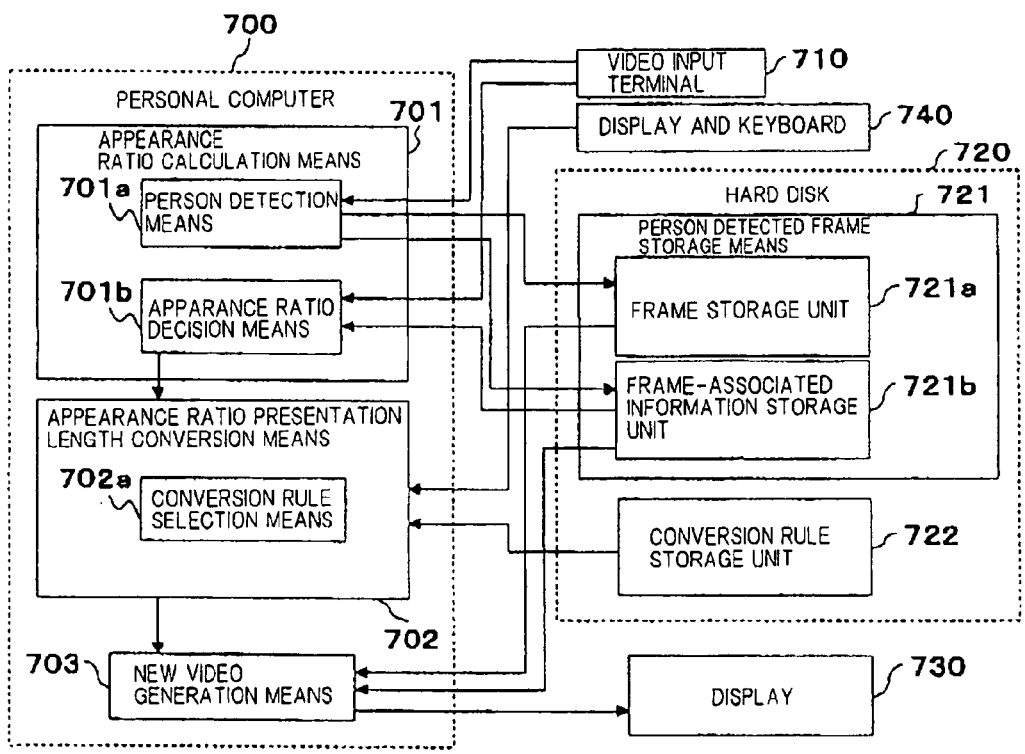
FIG. 22 is a block diagram showing the configuration of Example 2 of the present invention.

As shown in FIG. 22, this Example comprises video input terminal 710 as video input means, a display and keyboard 740 as a command input device, personal computer 700 as a data processing device, hard disk 720 as a storage device, and display 730 as video output means, respectively. The display which forms part of the command input device and the display which comprises the video output means may be comprised of separate displays, or a single display may be used for the two purposes.

Conversion rule storage unit 722 stores a plurality of conversion rules illustrated in Example 1.

As a video is supplied from video input terminal 710, appearance ratio calculation means 701 calculates an appearance ratio of each performer in a manner similar to Example 1, and supplies the appearance ratios to appearance ratio presentation length conversion means 702. Appearance ratio presentation length conversion means 702 select one conversion rule from among the plurality of conversion rules stored in conversion rule storage unit 722 based on an input command from the user through display and keyboard 740, using conversion rule selection means 702a.

Figure 23:
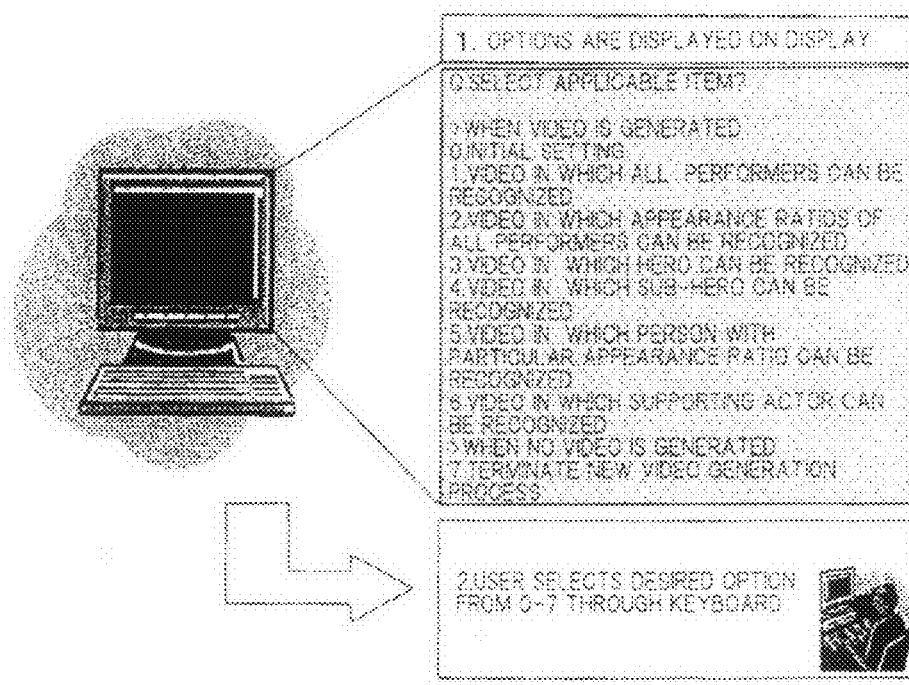
FIG. 23 is a diagram showing an example of options displayed on a display upon selection of a appearance ratio presentation length conversion scheme in Example 2 of the present invention.

An example of options displayed on the display which forms part of the command input device is shown in FIG. 23. First, the display displays options 1 to 6 correspond to the types of new videos illustrated in Example 1, option 0 for initial setting, and option 7 for terminating a video generation process. In this regard, options 1-6 have previously corresponded to conversion rules that are necessary for generating types of new videos corresponding thereto. Also, option 0 that is to be initially set has previously corresponded to one of these conversion rules. The user selects a desired option from such a group of options through keyboard input. In addition, it is possible to add a configuration for the user himself to directly enter a conversion rule which has desired characteristics.

Upon receipt of the user's keyboard input, conversion rule selection means 702a selects a conversion rule corresponding to the selected option from conversion rule storage unit 722. Appearance ratio presentation length conversion means 702 calculates the presentation length of each appearing person using the conversion rule selected by conversion rule selection means 702a, and outputs the presentation rules to new video generation means 703. New video presentation means 703 selects frames of each person for the presentation length from frame numbers stored in frame-associated information storage unit 721b on a person-by-person basis, and extracts image information corresponding to the selected frames from frame storage unit 721a. Then the extracted frames are combined to generate a new video which is output to display 730.

EXAMPLE 3

Example 3 shows an example in which the video generation device of the present invention is utilized to generate a video for persons who appear in an input video. Such Example corresponds to the third exemplary embodiment of the present invention.

Figure 24:
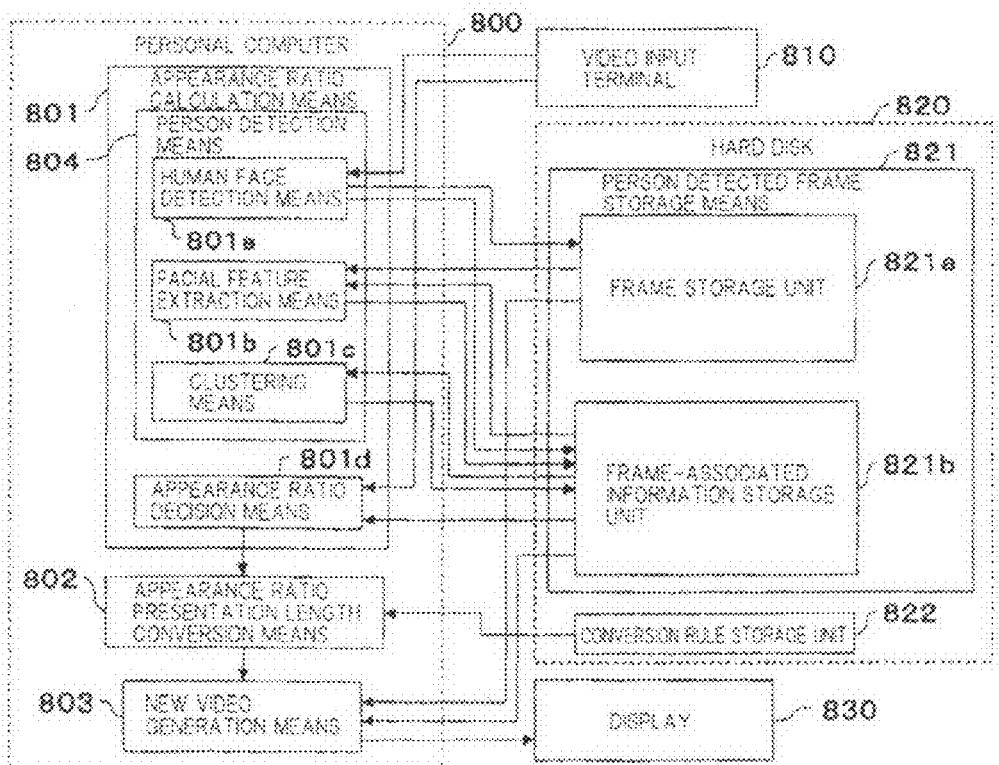
FIG. 24 is a block diagram showing the configuration of Example 3 of the present invention.

As shown in FIG. 24, this Example comprises video input terminal 810 as video input means, personal computer 800 as a data processing device, a hard disk 820 as a storage device, and display 830 as video output means.

As a video is supplied through video input terminal 810, each means in personal computer 800 operates in the following manner.

Human face detection means 801a of person detection means 804 detects a human face for each frame of the input video, and stores image information of frames in which human faces are detected in frame storage unit 821a of hard disk 820. Also, frame numbers of the frames and face detected positions are stored in frame-associated information storage unit 821b of hard disk 820.

Facial feature extraction means 801b extract a facial feature based on the face detected positions stored in frame-associated information storage unit 821b from all frames stored in frame storage unit 821a, and store the extracted feature in frame-associated information storage unit 821b in correspondence to each human face.

Clustering means 801c aggregates frames, in which features with similar values are extracted, into the same cluster as frames in which the same person is detected according to the facial feature stored in frame-associated information storage unit 821b. Frames belonging to the same cluster are given the same cluster number, and are stored in frame-associated information storage unit 821b.

As examples of human face detection approaches, there is an approach of detecting a face using a template which is created by making use of the fact that the contour of the face (head) is in an oval shape, and the eye and mouth are in elongated shapes, as shown in Reference 1 [Yoshio Iwai and three others, "Face Detection and Face Recognition through Image Processing," Search Report of Information Processing Society of Japan (CVIM-149), 2005, pp. 343-368], an approach of detecting a face by making use of the characteristic of luminance distribution in which cheeks and forehead have high luminance, while eyes and mouth have low luminance, an approach of detecting a face by making use of the symmetry of the face, a skin color area, and position, and the like. Also, as method for statistically learning based upon a feature distribution derived from learning samples of a large amount of human faces and non-faces to determine whether a feature derived from an input image belongs to a face distribution or a non-face distribution, there are approaches which utilizes a neural network, a support vector machine, an AdaBoost method and the like. As a human face detection method, the foregoing approaches may be utilized or other approaches may be utilized.

As an example of a human facial feature, as shown in Reference 2 [Mikio Takagi and Yohisa Shimoda, "Newly Edited Image Analysis Hand Book," Tokyo University Publication, September 2004, pp. 1569-1582], there is a feature vector which numerically describes the shapes of the eyes, nose and mouth, positional relationships, and the like, utilizing knowledge about the features of the face, a feature vector represented as a two-dimensional array of contrast values of each pixel of a face, a feature vector called Gabor jet which can express local periodicity and its directional property derived by applying a wavelet transform at each feature point of a pattern, and the like. As a human facial feature used to determine the similarity between persons, the foregoing examples may be utilized, or other approaches may be applied.

As an example of an approach of clustering a human facial feature, there is a hierarchical clustering method and a K-means method, as shown in Reference 3 [Shigeru Akamatsu, "Recognition of Face by Computer—Survey—," Transactions of the Institute of Electronics, Information and Communication Engineers, Vol. J80-A NO. 8, pp. 121a5-1230]. The hierarchical clustering is an approach which first regards all elements as a cluster comprised of a single element, and which merges the clusters in order from less distanced ones for aggregation into a proper number of groups. The K-means method in turn is an approach which determines a prototype, which is representative of each of a previously fixed number of clusters, and determines that each element to which the least distanced prototypes belong is a cluster. These are approaches of classifying elements using the similarity among the elements, but approaches other than the foregoing may be applied.

Appearance ratio decision means 801*d* measures the number of frames in which each person is detected from the number of frames which belong to the cluster of each person stored in frame-associated information storage unit 821*b*. The appearance ratio of each person is calculated from the number of frames in which each person is detected and the total number of frames of the input video using a conversion rule such as the one illustrated in Example 1, and the calculated appearance ratios are supplied to appearance ratio presentation length conversion means 802.

Appearance ratio presentation length conversion means 802 decides a presentation length of each person using the conversion rule as illustrated in Example 1, and supplies the decided presentation length of each person to new video generation means 803.

New video generation means 803 receives the presentation length of each object from appearance ratio presentation length conversion means 802, and selects frame numbers which are to be utilized in a new video for the presentation length of each object from frames (in which each object is detected), that were given the number of each cluster, and that were stored in frame-associated information storage unit 821*b*. Then, image information of the frame numbers selected for the presentation lengths are retrieved from frame storage unit 821*a*, and combined to create the new video. The processing of selecting frames to be utilized in the new video for the presentation lengths from frames in which each person is detected is implemented in the following manner in accordance with applications of new videos.

(1) New Image which Utilizes Frames of Average Characteristic

First, in frame-associated information storage unit 821*b*, a feature is extracted from frames in which each person is detected, which are aggregated into the same cluster as frames which include the same person. Next, a distribution in a feature space is observed for the value of a facial feature of the same person extracted from the frames which belong to the same cluster. In this event, the frame, from which the value that is closest to the center of the distribution is extracted, is thought to be a frame which has the most average characteristic of the cluster. The average characteristic is exemplified by a serious face when faces with various facial expressions are collected, by a front face when faces with various orientations are collected, and by a face image under a uniform illumination condition when faces under various illuminations are collected. Thus, when a new video is created making use of frames that have average characteristics, frames are utilized in the generation of the new video in order from a frame in which a feature value close to the center is extracted in the distribution of values of the facial feature of each person.

(2) New Video Utilizing Frames of Wide Variety of Characteristics

First, a feature is extracted from frames in which each person is detected, and which are aggregated into the same cluster as frames which include the same person. Next, a distribution in a feature space is observed for the value of a facial feature of the same person extracted from the frames which belong to the same cluster. In this event, a pair of features which are distributed at positions spaced away from each other are regarded as a pair of frames which differ in characteristics. A pair of frames differing in characteristics may be exemplified by a smiling face and an angry face, a downward oriented face and an upward oriented face, and the like. Thus, when a new video is created making use of frames having various characteristics, a frame from which a proper feature value is extracted is first selected in the distribution of facial feature values of each person, and a frame from which a feature value is extracted, and whose value is distributed at the position furthest away from a feature value derived from a previously selected frame, is utilized in the sequence from the second frame onward in the generation of the new video. The generated new video is output to display 830.

INDUSTRIAL AVAILABILITY

It is possible to apply the present invention for the purpose of a video generation device which selects a target video from a plurality of videos or recognizes video contents in a short time, or for the purpose of a program that implements such a video generation device by a computer. It is also possible to apply the present invention to the purpose for implementing a video generation device for use in arrangement, classification, viewing, browsing and the like of home video. Also, it is possible to apply the present invention to the purpose for implementing a system for generating a video in order to recognize in a short time which person appear for how may times from a video captured by a monitoring camera for a long time. Also, in a system for performing video editing using numerous videos, it is possible to apply the present invention to the purpose of a video generation device in which videos for use in editing is selected, or the purpose of a program for implementing such a video generation device by a computer.

The invention claimed is:

1. A video generation device comprising:
   an appearance ratio calculation unit which calculates an appearance ratio of each object which appears in an input video;
   a conversion rule storage unit which stores a conversion rule which is a rule for converting the appearance ratio to a presentation length which is a length of time of a video with regard to each object in a new video; and
   an appearance ratio presentation length conversion unit which converts the calculated appearance ratio to the presentation length in accordance with the conversion rule.

2. The video generation device according to claim 1, said video generation device further comprising:
   a new video generation unit that edits the input video to generate a new video which substantially satisfies the presentation length of the video related to each object resulting from the conversion.

3. The video generation device according to claim 2, wherein said appearance ratio presentation length conversion unit converts the appearance ratio of each object to the presentation length using a conversion rule which uniformly determines a presentation length corresponding to an appearance ratio.

4. The video generation device according to claim 3, wherein said appearance ratio presentation length conversion unit converts the appearance ratio of each object to the presentation length using a conversion rule which is selected by a user from among a plurality of conversion rules different from one another.

5. The video generation device according to claim 3, wherein said conversion rule is a rule which results in the presentation length being equal to zero after the conversion depending on the value of the appearance ratio.

6. The video generation device according to claim 3, wherein said conversion rule is a rule which does not result in the presentation length being equal to zero after the conversion, irrespective of the value of the appearance ratio.

7. The video generation device according to claim 2, wherein said appearance ratio calculation unit includes object detection means for detecting each object which appears in the input video, and appearance ratio decision means for receiving a detection result from said object detection means to calculate the appearance ratio of each object from the detected video length of each object and the length of the input video.

8. The video generation device according to claim 7, wherein said object detection means includes object group detection means for detecting an object group which appears in the input video, feature extraction means for extracting each feature of the object group detected by said object group detection means, and clustering means for aggregating frames, from which features of similar values are extracted for the features extracted by said feature extraction means, into the same group as frames in which the same object is detected, to generate a cluster which collects frames in which each object is detected.

9. The video generation device according to claim 8, wherein said new video generation unit extracts, for the presentation length of each object, video sections in which each object appears from the input video, and connects the video sections to each other in a time series manner, wherein said new video generation unit, upon extracting the video sections, preferentially extracts a frame from which a feature of a value close to a center is extracted in a distribution of a feature space which is indicated by the values of the features of frames which include the same object.

10. The video generation device according to claim 8, wherein said new video generation unit extracts, for the presentation length of each object, video sections in which each object appears from the input video, and connects the video sections to each other in a time series manner, wherein said new video generation unit, upon extracting the video sections, preferentially extracts frames from which features that are distributed at positions spaced away from each other are extracted in a distribution of a feature space which is indicated by the values of the features of frames which include the same object.

11. The video generation device according to claim 2, wherein said new video generation unit extracts, for the presentation length of each object from the input video, a video section in which each object appears, and connects the video sections to each other in a time series manner.

12. The video generation device according to claim 1, wherein said presentation length of the video is either the length of time of a video presented in a new video, the number of frames, or the number of video sections generated by delimiting the video under certain conditions.

13. The video generation device according to claim 1, wherein said object is a person.

14. The video generation device according to claim 7, wherein said object is a person, and said object detection means detects the face of the person.

15. A video generation method, comprising:
   a) calculating an appearance ratio of each object which appears in an input video;
   b) reading a conversion rule stored in a conversion rule storage unit, wherein the conversion rule is a rule for converting the appearance ratio to a presentation length which is a length of time of a video with regard to each object in a new video; and
   c) converting the calculated appearance ratio to the presentation length in accordance with the conversion rule.

16. The video generation method according to claim 15, further comprising:
   d) editing the input video to generate a new video which substantially satisfies the presentation length of the video related to each object resulting from the conversion.

17. The video generation method according to claim 16, wherein said step c includes the step of converting the appearance ratio of each object to the presentation length using a conversion rule which uniformly determines a presentation length that corresponds to an appearance ratio.

18. The video generation method according to claim 17, wherein said step c includes the step of converting the appearance ratio of each object to the presentation length using a conversion rule which is selected by a user from among a plurality of conversion rules that are different from one another.

19. The video generation method according to claim 17, wherein said conversion rule is a rule which results in the presentation length being equal to zero after the conversion depending on the value of the appearance ratio.

20. The video generation method according to claim 17, wherein said conversion rule is a rule which does not result in the presentation length being equal to zero after the conversion, irrespective of the value of the appearance ratio.

21. The video generation method according to claim 16, wherein said step a includes the steps of:
   a-1) detecting each object which appears in the input video; and a-2) receiving a detection result in said step a-1) to calculate the appearance ratio of each object from the detected video length of each object and from the length of the input video.

22. The video generation method according to claim 21, wherein said step a-1 includes the steps of:
   a-1-1) detecting an object group which appears in the input video;
   a-1-2) extracting each feature of the object group detected by said step a-1-1; and
   a-1-3) aggregating frames, from which features of similar values are extracted for the features extracted by said step a-1-2, into the same group as frames in which the same object is detected, to generate a cluster which collects frames in which each object is detected.

23. The video generation method according to claim 22, wherein said step d includes the step of extracting, for the presentation length of each object, video sections in which each object appears from the input video, and the step of connecting the video sections to each other in a time series manner, wherein, upon extracting the video sections, a frame is preferentially extracted when a feature of a value close to the center is extracted therefrom in a distribution of a feature space which is indicated by the values of the features of frames which include the same object.

24. The video generation method according to claim 22, wherein said step d includes the step of extracting, for the presentation length of each object, video sections in which each object appears from the input video and the step of connecting the video sections to each other in a time series manner, wherein, upon extracting the video sections, frames are preferentially extracted when features that are distributed at positions spaced away from each other are extracted therefrom in a distribution of a feature space which is indicated by the values of the features of frames which include the same object.

25. The video generation method according to claim 16, wherein said step d includes the step of extracting, for the presentation length of each object, video sections in which each object appears from the input video, and the step of connecting the video sections to each other in a time series manner.

26. The video generation method according to claim 15, wherein said presentation length of the video is either the length of time of a video presented in a new video, the number of frames, or the number of video sections generated by delimiting the video under certain conditions.

27. The video generation method according to claim 15, wherein said object is a person.

28. The video generation method according to claim 21, wherein said object is a person, and said step a-1 is a step of detecting the face of the person.

29. A non-transitory recording medium recorded with a video generation program which causes a computer to execute a method to generate a new video, the method comprising:
   a) calculating an appearance ratio of each object which appears in an input video;
   b) reading a conversion rule stored in a conversion rule storage unit, wherein the conversion rule is a rule for converting the appearance ratio to a presentation length which is a length of time of a video with regard to each object in a new video; and
   c) converting the calculated appearance ratio to the presentation length in accordance with the conversion rule.

30. The non-transitory, recording medium according to claim 29, wherein the method to generate a new video further comprises: d) editing the input video to generate a new video which substantially satisfies the presentation length of the video related to each object resulting from the conversion.

31. The non-transitory recording medium according to claim 30, wherein step c of the method to generate a new video includes the step of converting the appearance ratio of each object to the presentation length using a conversion rule which uniformly determines a presentation length corresponding to an appearance ratio.

32. The non-transitory recording medium according to claim 31, wherein step c of the method to generate a new video includes the step of converting the appearance ratio of each object to the presentation length using a conversion rule which is selected by a user from among a plurality of conversion rules that are different from one another.

33. The non-transitory recording medium according to claim 31, wherein said conversion rules is a rule which results in the presentation length being equal to zero after the conversion depending on the value of the appearance ratio.

34. The non-transitory recording medium according to claim 31, wherein said conversion rule is a rule which does not result in the presentation length being equal to zero after the conversion, irrespective of the value of the appearance ratio.

35. The non-transitory, recording medium according to claim 30, wherein step a of the method to generate a new video includes steps of:
   a-1) detecting each object which appears in the input video; and
   step a-2) receiving a detection result in said step a-1) to calculate the appearance ratio of each object from the detected video length of each object and from the length of the input video.

36. The non-transitory recording medium according to claim 35, wherein step a-1 of the method to generate a new video includes the steps of:
   a-1-1) detecting an object group which appears in the input video;
   a-1-2) extracting each feature of the object group detected by said step a-1-1; and
   a-1-3) aggregating frames, from which features of similar values are extracted for the features extracted by said step a-1-2, into the same group as frames in which the same object is detected, to generate a cluster which collects frames in which each object is detected.

37. The non-transitory recording medium according to claim 36, wherein said step d of the method to generate a new video includes the step of extracting, for the presentation length of each object, video sections in which each object appears from the input video, and the step of connecting the video sections to each other in a time series manner, wherein, upon extracting the video sections, preferentially extracts a frame from which a feature of a value close to the center is extracted in a distribution of a feature space which is indicated by the values of the features of frames which include the same object.

38. The non-transitory recording medium according to claim 36, wherein said step d of the method to generate a new video includes the step of extracting, for the presentation length of each object, video sections in which each object appears from the input video, and the step of connecting the video sections to each other in a time series manner, wherein, upon extracting the video sections, preferentially extracts a frame from which features that are distributed at positions spaced away from each other are extracted in a distribution of a feature space which is indicated by the values of the features of frames which include the same object.

39. The non-transitory recording medium according to claim 30, wherein said step d of the method to generate a new video includes extracting, for the presentation length of each object, video sections in which each object appears from the input video, and connects the video sections to each other in a time series manner.

40. The non-transitory recording medium according to claim 29, wherein said presentation length of the video is either the length of time of a video presented in a new video, the number of frames, or the number of video sections generated by delimiting the video under certain conditions.

41. The non-transitory recording medium according to claim 29, wherein said object is a person.

42. The non-transitory recording medium according to claim 35, wherein said object is a person, and said step a-1 of the method to generate a new video detects the face of the person.

* * * * *